(12) United States Patent
Ishi (10) Patent No.: US 8,915,681 B2
(45) Date of Patent: Dec. 23, 2014

(54) CUTTING INSERT, CUTTING TOOL, AND METHOD OF MANUFACTURING MACHINED PRODUCT USING THE SAME

(75) Inventor: Hirohisa Ishi, Higashiomi (JP)

(73) Assignee: Kyocera Corporation, Kyoto (JP)

( * ) Notice: Subject to any disclaimer, the term of this patent is extended or adjusted under 35 U.S.C. 154(b) by 372 days.

(21) Appl. No.: 13/393,450

(22) PCT Filed: Aug. 30, 2010

(86) PCT No.: PCT/JP2010/064702
§ 371 (c)(1),
(2), (4) Date: Feb. 29, 2012

(87) PCT Pub. No.: WO2011/092883
PCT Pub. Date: Aug. 4, 2011

(65) Prior Publication Data
US 2012/0155976 A1 Jun. 21, 2012

(30) Foreign Application Priority Data

Jan. 29, 2010 (JP) ................................. 2010-019307

(51) Int. Cl.
*B23C 5/22* (2006.01)
*B23C 5/20* (2006.01)
*B23C 5/06* (2006.01)

(52) U.S. Cl.
CPC ............. *B23C 5/06* (2013.01); *B23C 2200/164* (2013.01); *B23C 5/202* (2013.01); *B23C 2200/208* (2013.01); *B23C 2200/0444* (2013.01)
USPC ............................... 409/132; 407/113; 407/42

(58) Field of Classification Search
CPC ..................... B32C 5/2213; B32C 2200/0444; B32C 2200/0422; B32C 2200/0477; B32C 5/22

USPC ....................... 409/132; 407/113–115, 42, 61
See application file for complete search history.

(56) References Cited

U.S. PATENT DOCUMENTS 5,951,214 A * 9/1999 Rothballer et al. ............. 407/42
5,971,672 A 10/1999 Hansson
(Continued)

FOREIGN PATENT DOCUMENTS

EP 0672492 A1 * 9/1995 ................ B23C 5/22
EP 1066903 A2 * 1/2001 ................ B23C 5/22
(Continued)

OTHER PUBLICATIONS

Statement of Relevance of Non-English References, 1 pp.
(Continued)

*Primary Examiner* — Daniel Howell
*Assistant Examiner* — Ryan Rufo
(74) *Attorney, Agent, or Firm* — Volpe and Koenig, P.C.

(57) ABSTRACT

A cutting insert with a first flat and major cutting edges in order in an intersection region of a first side surface and an upper surface, and a second flat and major cutting edges in order in an intersection region of a second side surface and upper surface. The first and second side surfaces include respective first and second chamfered side surfaces, respective first and second corner side surfaces, and respective first and second major side surfaces in order. The intersection region of the second side surface and upper surface includes a first intersection region of the second chamfered side surface and upper surface, and a second intersection region of the second corner side surface and upper surface. The second flat cutting edge is located from the first intersection region to the second intersection region, and has a lowermost portion in the first intersection region in a side view.

14 Claims, 7 Drawing Sheets

(56) References Cited

U.S. PATENT DOCUMENTS

| | | | |
|---|---|---|---|
| 2007/0003384 A1* | 1/2007 | Smilovici et al. | 407/113 |
| 2007/0297865 A1 | 12/2007 | Hessman | |
| 2009/0285646 A1* | 11/2009 | Oprasic et al. | 407/114 |
| 2010/0034602 A1* | 2/2010 | Sung et al. | 407/113 |
| 2010/0221076 A1* | 9/2010 | Takahashi et al. | 407/42 |
| 2010/0239379 A1* | 9/2010 | Choi et al. | 407/114 |
| 2012/0057943 A1* | 3/2012 | Zastrozynski et al. | 407/30 |

FOREIGN PATENT DOCUMENTS

| | | | | |
|---|---|---|---|---|
| EP | 2436465 | | 4/2012 | |
| EP | 2446992 | | 5/2012 | |
| EP | 2495060 | | 9/2012 | |
| JP | H09-509104 | | 9/1997 | |
| JP | 10507693 A | | 7/1998 | |
| JP | 2001-219315 A | * | 8/2001 | ............... B23C 5/20 |
| JP | 2007-237356 | | 9/2007 | |
| JP | 2008-006579 | | 1/2008 | |
| JP | 2009-208172 | | 9/2009 | |
| WO | 2010093488 | | 8/2010 | |

OTHER PUBLICATIONS

Japanese Office Action, Japanese Patent Application No. JP 2011-551664, Jul. 2, 2013, 1 pp.

First Office Action dated Apr. 26, 2013 issued by Chinese Patent Office for Chinese patent application No. 201080037472.4.

\* cited by examiner

CUTTING INSERT, CUTTING TOOL, AND METHOD OF MANUFACTURING MACHINED PRODUCT USING THE SAME

TECHNICAL FIELD

The present invention relates to a cutting insert, a cutting tool, and a method of manufacturing a machined product using the same.

BACKGROUND ART

Japanese Unexamined Patent Publication No. 9-509104 discloses a cutting insert 1b having a secondary sub cutting edge 5b parallel to a support surface 3, between a major cutting edge 4a and a sub cutting edge 5a, as shown in FIG. 14 in the publication.

However, when the cutting insert 1b is attached to a tool 14 with a negative axial rake angle, the secondary sub cutting edge 5b protrudes toward the front end of the tool 14 than the sub cutting edge 5a. There is therefore a risk of deterioration of the smoothness of a machined surface (bottom surface) of a workpiece.

SUMMARY OF THE INVENTION

An object of the present invention is to provide a cutting insert and a cutting tool, which allow the machined surface of the workpiece to be cut with high smoothness, and a method of manufacturing a machined product using the cutting tool.

A cutting insert of the present invention includes an upper surface; a lower surface; a side surface which is connected to the upper surface and the lower surface and has a first side surface and a second side surface in order; and a cutting edge includes a first flat cutting edge and a first major cutting edge in order in an intersection region of the first side surface and the upper surface, and has a second flat cutting edge and a second major cutting edge in order in an intersection region of the second side surface and the upper surface. The first side surface includes a first chamfered side surface with a curved shape, a first corner side surface with a planar shape, and a first major side surface in order. The second side surface includes a second chamfered side surface with a curved shape, a second corner side surface with a planar shape, and a second major side surface in order. The intersection region of the second side surface and the upper surface includes a first intersection region of the second chamfered side surface and the upper surface, and a second intersection region of the second corner side surface and the upper surface. The second flat cutting edge is located from the first intersection region to the second intersection region, and has a lowermost portion in the first intersection region in a side view.

A cutting tool according to an embodiment of the present invention includes the cutting insert and a holder configured to attach the cutting insert thereto.

A method of manufacturing a machined product according to an embodiment of the present invention includes rotating the cutting tool; bringing the cutting edge of the rotating cutting tool into contact with a workpiece; and separating the cutting tool from the workpiece.

In the cutting insert according to the foregoing embodiment, the second flat cutting edge is located from the first intersection region to the second intersection region, and has the lowermost portion in the first intersection region in the side view. Therefore, even when the cutting insert is attached to the holder by setting the axial rake angle of the cutting insert to a negative value, the second flat cutting edge can be positioned substantially parallel to the machined surface of the workpiece over the entire length of the second flat cutting edge, thus allowing the machined surface of the workpiece to be cut with high smoothness. Additionally, not only the cutting edge portion (the first inclined cutting edge) located in the second intersection region, but also the cutting edge portion (the curved cutting edge) located in the first intersection region is usable as a part of the second flat cutting edge. This ensures the desired length of the second flat cutting edge while relatively shortening the first inclined cutting edge. Consequently, the entire length of the second major cutting edge can be further elongated, thus ensuring a large depth of cut.

PREFERRED EMBODIMENTS FOR CARRYING OUT THE INVENTION

<Cutting Insert>

An embodiment of the cutting insert (hereinafter referred to as an "insert" in some cases) according to the present invention is described in detail below with reference to FIGS. 1 to 3.

Figure 1:
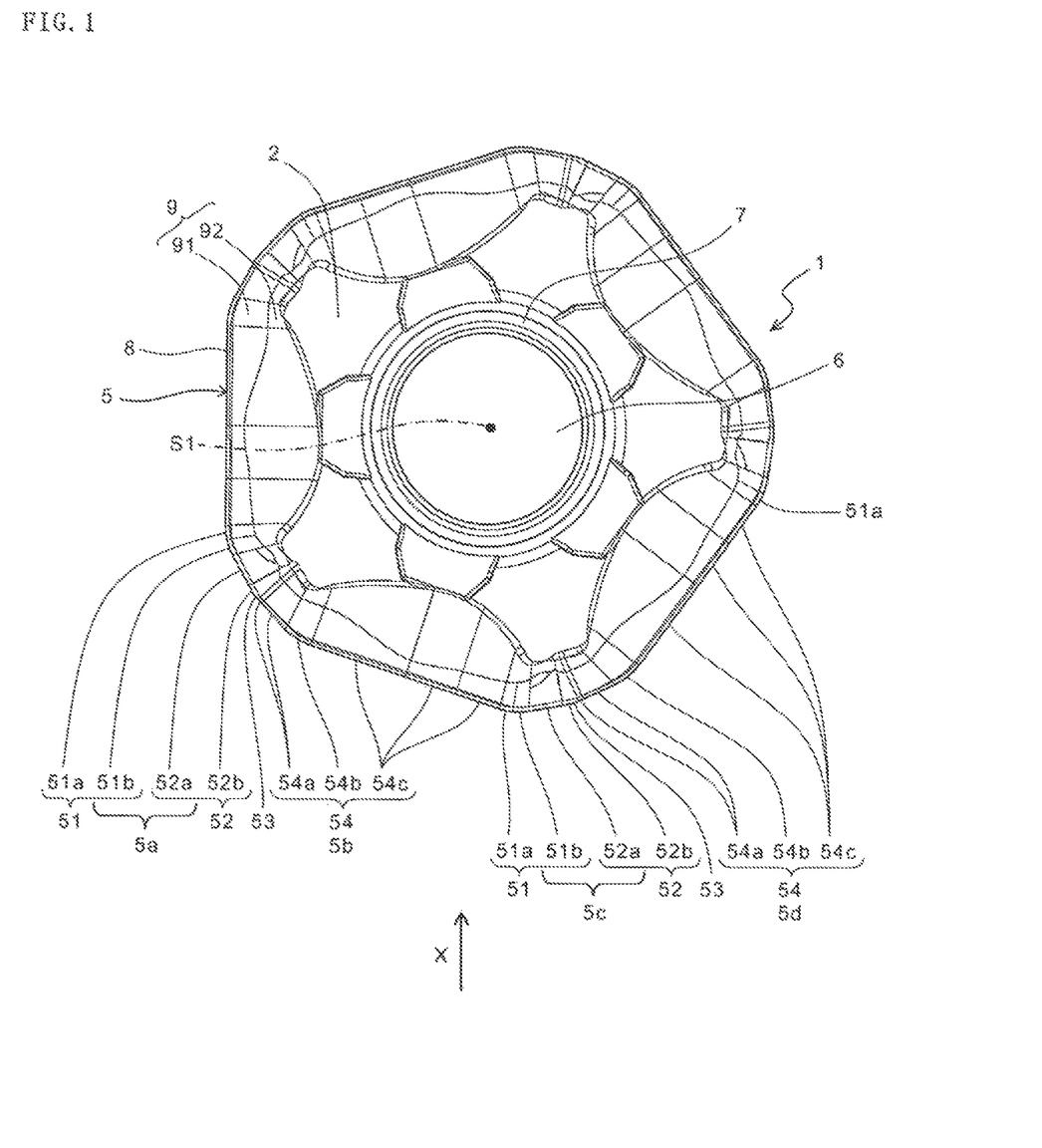
FIG. 1 is a top view showing a cutting insert according to an embodiment of the present invention.
Figure 2:
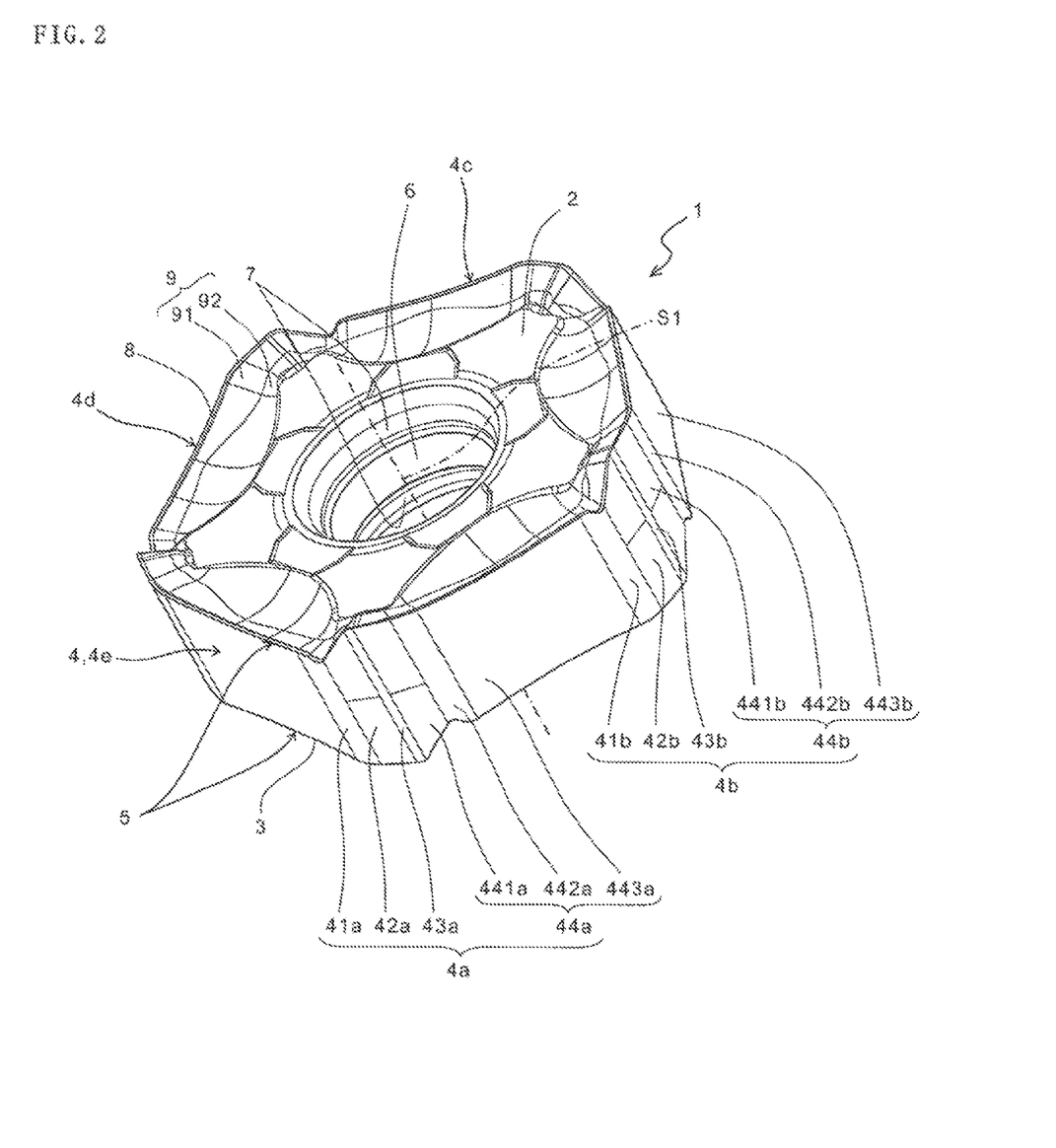
FIG. 2 is a perspective view of the cutting insert shown in FIG. 1.

As shown in FIGS. 1 and 2, the insert 1 of the present embodiment generally includes a top surface 2, a lower surface 3, a side surface 4 connected to the top surface 2 and the lower surface 3, and a cutting edge 5 located in an intersection region of the top surface 2 and the side surface 4. As shown in FIG. 3(b), a second flat cutting edge 5c included in the cutting edge 5 is located from a first intersection region L1 to a second intersection region L2 in the intersection region, and has a lowermost portion V in the first intersection region L1 in a side view.

Figure 6:
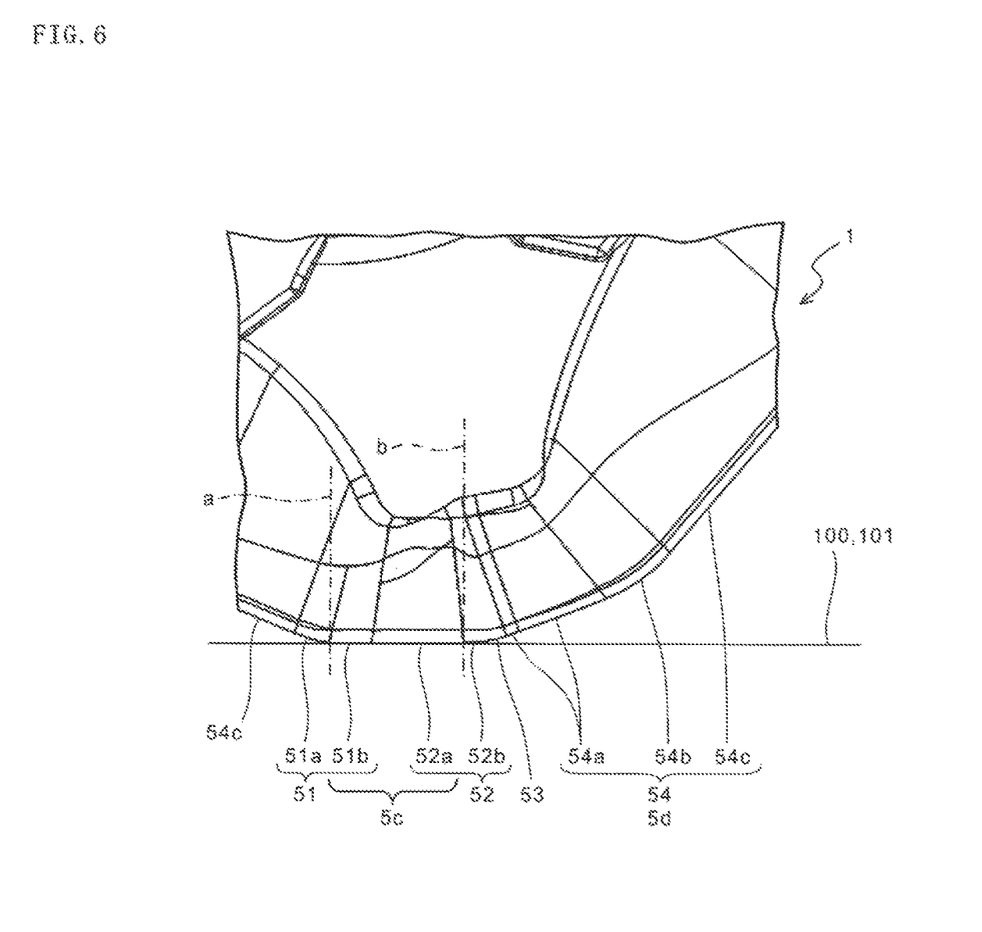
FIG. 6 is another partially enlarged view of the cutting tool shown in FIG. 4.

The insert 1 has the above configuration. Therefore, even when the insert 1 is attached to a holder 21 shown in FIG. 4 by setting the axial rake angle thereof to a negative value with respect to the holder 21, as shown in FIG. 6, the second flat cutting edge 5c can be positioned substantially parallel to the machined surface 101 of the workpiece 100 over the entire length of the second flat cutting edge, thus allowing the machined surface 101 of the workpiece 100 to be cut with high smoothness. In FIG. 3(b), not only a first inclined cutting edge 52a located in the second intersection region L2, but also a curved cutting edge 51b (cutting edge portion) located in the first intersection region L1 is usable as a part of the second flat cutting edge 5c. Therefore, the desired length of the second flat cutting edge 5c can be ensured while relatively shortening the first inclined cutting edge 52c. Consequently, the entire length of the second major cutting edge 5d can be further increased, thereby ensuring a large depth of cut. Hereinafter, the components of the insert 1 are described in detail below.

The insert 1 includes a substantially polygonal plate shaped body. The body includes the top surface 2, a part of which functions as a rake surface 9; the lower surface 3, a part of which functions as a seating surface; and the side surface 4 that functions as a flank surface. No particular limitation is imposed on the shape of the body. That is, the body may have a certain shape usually employed by those skilled in the art, such as triangle, quadrangle, pentagon, hexagon, and octagon in a top view. The present embodiment employs a substantially pentagonal shape having five long sides.

The body is preferably made of a cemented carbide substrate, a cermet substrate, or the like. A PVD film or CVD film formed by PVD method or CVD method, or a composite film of these is preferably formed on the surface of these substrates. In particular, a structure having the PVD film formed on the surface of the cemented carbide substrate is suitable in the machining necessitating chipping resistance, such as when cutting steel, stainless steel, or ductile cast iron. A structure having the CVD film formed on the surface of the cemented carbide substrate is suitable in the machining necessitating wear resistance, such as high-speed cutting of gray cast iron. A structure having the PVD film formed on the surface of the cermet substrate is suitable in finishing.

The insert 1 is a so-called negative type insert in which the side surface 4 is perpendicularly connected to the upper surface 2 and the lower surface 3, and both the upper surface 2 and the lower surface 3 can be used as the rake surface. Therefore, in the insert 1, five corners per surface, or ten corners on both the upper and lower surfaces can be used for cutting process.

To be specific, the cutting edge 5 is also formed in the intersection region of the lower surface 3 and the side surface 4. Therefore, when cutting is carried out using the cutting edge 5 close to the lower surface 3, the lower surface 3 is usable as a rake surface, and the upper surface 2 is usable as a seating surface. In the present embodiment, the cutting edge 5 close to the lower surface 3 has a shape obtained by reversing the cutting edge 5 close to the upper surface 2. That is, these cutting edges 5 of the upper and lower surfaces are rotationally symmetric about a line perpendicular to the paper surface of FIG. 3(a).

The side surface 4 is continuous with the upper surface 2 and the lower surface 3. As shown in FIG. 2, the side surface 4 includes a first side surface 4a, a second side surface 4b, a third side surface 4c, a fourth side surface 4d, and a fifth side surface 4e which are respectively connected to individual sides of the upper surface that is substantially a pentagon. These side surfaces 4a to 4e have similar configurations. Hence, the following description is given of the first side surface 4a and the second side surface 4b located adjacent to each other.

The first side surface 4a sequentially includes a first chamfered side surface 41a with a curved shape, a first corner side surface 42a with a planar shape, a first intermediate side surface 43a with a curved shape, and a first major side surface 44a with a planar shape. Similarly, the second side surface 4b sequentially includes a second chamfered side surface 41b with a curved shape, a second corner side surface 42b with a planar shape, a second intermediate side surface 43b with a curved shape, and a second major side surface 44b with a planar shape.

The cutting edge 5 described later is located in the intersection region of the side surface 4 and the upper surface 2. An intersection region of the first side surface 4a and the upper surface 2, and an intersection region of the second side surface 4b and the upper surface 2 have similar configurations. The intersection region of the second side surface 4b and the upper surface 2 in these intersection regions is described below. As shown in FIG. 3(b), this intersection region includes a first intersection region L1 of the second chamfered side surface 41b and the upper surface 2, a second intersection region L2 of the second corner side surface 42b and the upper surface 2, a third intersection region L3 of the second intermediate side surface 43b and the upper surface 2, and a fourth intersection region L4 of the second major side surface 44b and the upper surface 2.

As shown in FIGS. 1 and 2, the cutting edges 5 located in these intersection regions respectively correspond to the side surfaces (41a, 41b to 44a, and 44b), and have five combinations to the substantially pentagon, which are respectively made up of a chamfered cutting edge 51, a corner cutting edge 52, an intermediate cutting edge 53, and a primary cutting edge 54. These cutting edges 51 to 54 produce a configuration in which the flat cutting edge for improving the smoothness of the machined surface 101 of the workpiece 100, and the major cutting edge playing a role in generating chips during cutting action are alternately located.

To be specific, as shown in FIG. 1, the flat cutting edge and the major cutting edge are alternately located in the following order: the first flat cutting edge 5a, the first major cutting edge 5b, the second flat cutting edge 5c, and the second major cutting edge 5d. The first flat cutting edge 5a and the first major cutting edge 5b are sequentially located in the intersection region of the first side surface 4a and the upper surface 2. The second flat cutting edge 5c and the second major cutting edge 5d are sequentially located in the intersection region of the second side surface 4b and the upper surface 2. These flat cutting edges 5a and 5c have similar configurations, and these major cutting edges 5b and 5d have similar configurations. Hereinafter, the individual cutting edges 51 to 54 located in the intersection region of the second side surface 4b and the upper surface are mainly sequentially described.

Figure 3:
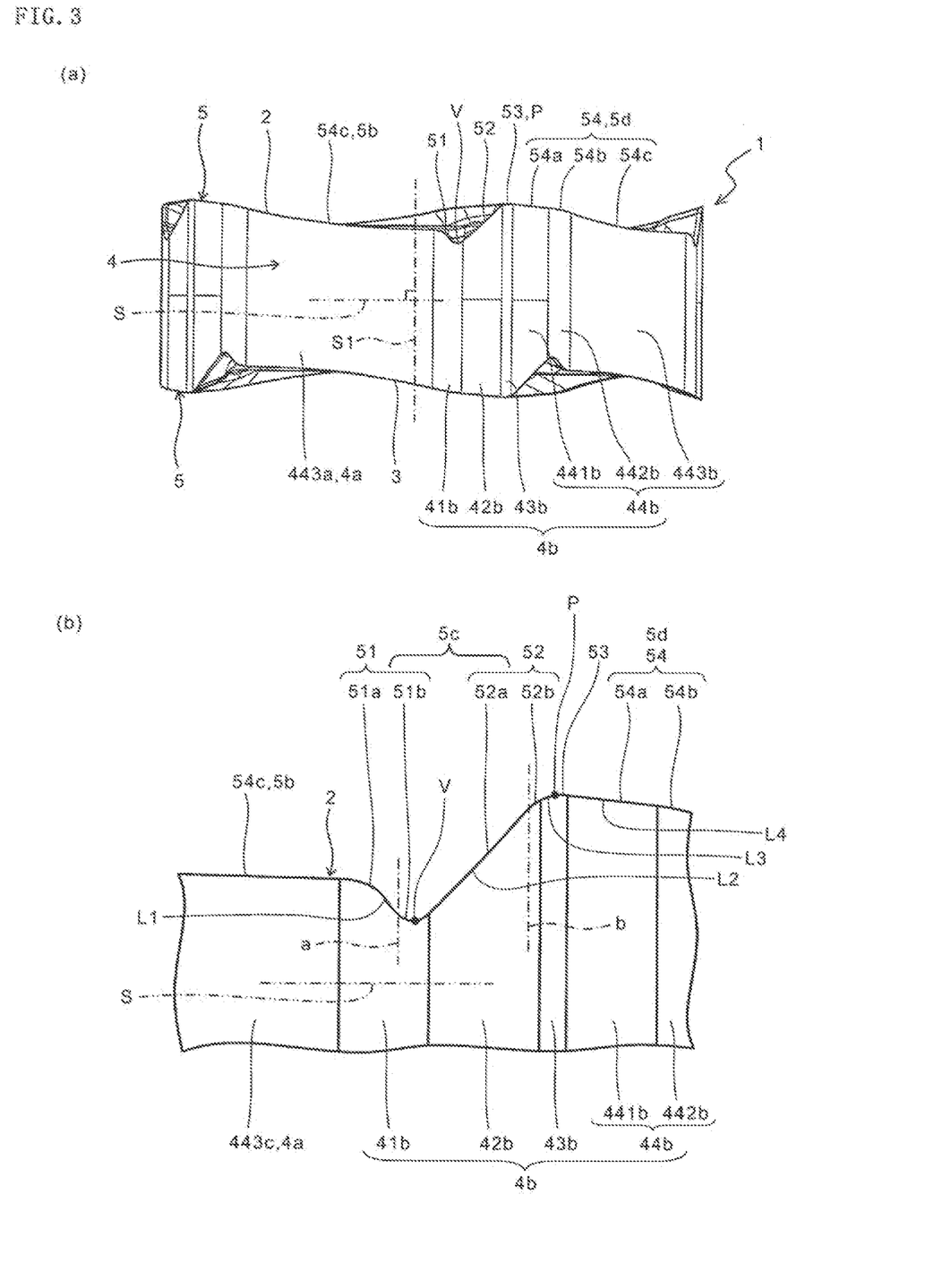
FIG. 3(a) is a side view of the cutting insert shown in FIG. 1 taken in the direction of arrow X.
FIG. 3(b) is a partially enlarged view thereof.

The chamfered cutting edge 51 is located in the first intersection region L1 correspondingly to the second chamfered side surface 41b, as shown in FIG. 3. The chamfered cutting edge 51 is an outward convex curve in a top view, and includes an auxiliary primary cutting edge 51a and a curved cutting edge 51b, as shown in FIG. 1.

The auxiliary primary cutting edge 51a is located between the first major cutting edge 5b and the curved cutting edge 51b (second flat cutting edge 5c). As shown in FIG. 3, the auxiliary primary cutting edge 51a is inclined downward from the adjacent first major cutting edge 5b to the curved cutting edge 51b (second flat cutting edge 5c) with respect to a reference plane S perpendicular to a central axis S1 of the insert 1 in a side view. More specifically, the auxiliary primary cutting edge 51a is continuously inclined downward with respect to the reference plane S, from the first major cutting edge 5b to the curved cutting edge 51b (second flat cutting edge 5c) in the side view. The first major cutting edge 5b and the second flat cutting edge 5c interpose therebetween the chamfered cutting edge 51 inclined downward with respect to the reference plane S. This reduces the probability that chips generated during cutting of the workpiece by the first major cutting edge 5b come into contact with the curved cutting edge 51b (second flat cutting edge 5c), thus making it possible to reduce damage to the curved cutting edge 51b (second flat cutting edge 5c).

The auxiliary primary cutting edge 51a may be used for generating chips together with the adjacent primary cutting edge 54 as needed. This ensures a large depth of cut. The auxiliary primary cutting edge 51a includes a portion whose downward inclination angle with respect to the reference plane S is increased from the first major cutting edge 5b to the curved cutting edge 51b (second flat cutting edge 5c) in the side view. Alternatively, the auxiliary primary cutting edge 51a may be configured so that the inclination angle thereof is gradually increased over the entire length thereof.

The curved cutting edge 51b has a the downward convex curve with respect to the reference plane S in the side view, and serves a function as a part of the second flat cutting edge 5c. An intermediate region of the curved cutting edge 51b constitutes a lowermost portion V of the cutting edge 5. In the present specification, the term "lowermost portion" denotes a portion, such as a point or region, located lowermost in the cutting edge 5 with respect to the reference plane S. In the present embodiment, a curve formed by the curved cutting edge 51b is a spline curve, as described in the following. Accordingly, the lowermost portion V in the present embodiment is not a region having a predetermined length, but a point located lowermost (lowermost point).

The curved cutting edge 51b has the spline curve as described above, and is positioned substantially parallel to the machined surface 101 of the workpiece 100 when the insert 1 is attached to the holder 21. This allows the machined surface 101 of the workpiece 100 to be cut with high smoothness. In the insert 1 of the present embodiment, not only the first inclined cutting edge 52a described later which is located at the second intersection region L2, but also the curved cutting edge 51b located in the first intersection region L1 is usable as a part of the second flat cutting edge 5c. This ensures the desired length of the second flat cutting edge 5c while relatively shortening the first inclined cutting edge 52a. Consequently, the entire length of the second major cutting edge 5d can be further increased, thereby ensuring a large depth of cut.

The corner cutting edge 52 is located in the second intersection region L2 correspondingly to the second corner side surface 42b. As shown in FIG. 1, the corner cutting edge 52 is a straight line in a top view, and includes a first inclined cutting edge 52a and a second inclined cutting edge 52b.

As shown in FIG. 3(b), the first inclined cutting edge 52a is inclined upward in a direction away from the curved cutting edge 51b with respect to the reference plane S in a side view, and serves a function as a part of the second flat cutting edge 5c. Thus, in the insert 1 of the present embodiment, the second flat cutting edge 5c includes the curved cutting edge 51b and the first inclined cutting edge 52a, and its one end portion "a" is located at the end of the curved cutting edge 51b close to the auxiliary primary cutting edge 51a, and its the other end portion "b" is located at the end of the first inclined cutting edge 52a close to the second inclined cutting edge 52b. Hence, the second flat cutting edge 5c is a downward convex curve on the whole with respect to the reference plane S in the side view. The second flat cutting edge 5c is located from the first intersection region L1 to the second intersection region L2, and includes the lowermost portion V in the first intersection region L1 in the side view. Additionally, the first inclined cutting edge 52a that functions as the second flat cutting edge 5c is inclined in the side view. Therefore, the width of the second corner side surface 42b that is the corresponding side surface in a top view can be relatively decreased. This ensures that the entire length of the second major cutting edge 5d is further increased, thereby ensuring a large depth of cut.

The second inclined cutting edge 52b is also inclined upward in a direction away from the first inclined cutting edge 52a with respect to the reference plane S in a side view, and the inclination angle thereof is decreased toward the intermediate cutting edge 53.

The intermediate cutting edge 53 is located in the third intersection region L3 correspondingly to the second intermediate side surface 43b, and connects the corner cutting edge 52 and the primary cutting edge 54. The intermediate cutting edge 53 is an outward convex curve in a side view, as shown in FIG. 1, and is an upward convex curve having an uppermost portion P in a side view, as shown in FIG. 3. In the present specification, the term "uppermost portion" denotes a portion, such as a point or region, located uppermost in the cutting edge 5 with respect to the reference plane S.

Hereat, the second inclined cutting edge 52b and the intermediate cutting edge 53 are located to connect the second flat cutting edge 5c and the second major cutting edge 5d, and are relatively gentle curves in a top view. These cutting edges serve a function to reduce fracture of the first cutting edge 54 described later.

The primary cutting edge 54 is located in the fourth intersection region L4 correspondingly to the second major side surface 44b, and includes a first cutting edge 54a, a second cutting edge 54b, and a third cutting edge 54c. As shown in FIG. 1, the first cutting edge 54a has a linear shape, the second cutting edge 54b has a curved shape, and the third cutting edge 54c has a linear shape in a top view.

The primary cutting edge 54 functions as a primary part of the first major cutting edge 5b and the second major cutting edge 5d, and is inclined downward with respect to the reference plane S in a side view. For example, the first major cutting edge 5b is described below. As shown in FIG. 3, the first major cutting edge 5b is inclined downward toward the second corner side surface 42b with respect to the reference plane S in the side view. More specifically, the first major cutting edge 5b is continuously inclined downward toward the second corner side surface 42b with respect to the reference plane S in the side view. This reduces cutting resistance. The first major cutting edge is not limited to the continuously inclined configuration, but may include, for example, a flat portion in the middle of the inclination thereof as needed.

The first cutting edge 54a has a larger peripheral cutting edge angle than the third cutting edge 54c, and plays a role in assisting the cutting by the third cutting edge 54c, such as mitigating the cutting resistance of the third cutting edge 54c, or reducing the damage to the third cutting edge 54c. The peripheral cutting edge angle is described later.

The second cutting edge 54b is an outward convex curve in a top view, and plays a role in connecting the linear first cutting edge 54a and the linear third cutting edge 54c. This avoids a vast difference between the thickness of chips generated by the third cutting edge 54c and the thickness of chips generated by the first cutting edge 54a, thus permitting the chip shape control. For example, the load exerted on the boundary of the first cutting edge 54a and the third cutting edge 54c during cutting can be dispersed by connecting the first cutting edge 54a and the third cutting edge 54c through the second cutting edge 54b. This reduces fracture occurred at the boundary and also permits smooth escape of the chips.

The third cutting edge 54c is made longer than the first cutting edge 54a and the second cutting edge 54b, and plays a major role in generating chips during cutting action.

Hereat, the term "peripheral cutting edge angle" described above denotes an inclination angle of the cutting edge 5 with respect to a rotation axis S2 of the holder 21 when the insert 1 is attached to the holder 21. For example, in the cutting tool 20 shown in FIG. 5, an angle θ formed by a line parallel to the rotation axis S2 of the holder 21 and the third cutting edge 54c is a peripheral cutting edge angle of the third cutting edge 54c.

Figure 5:
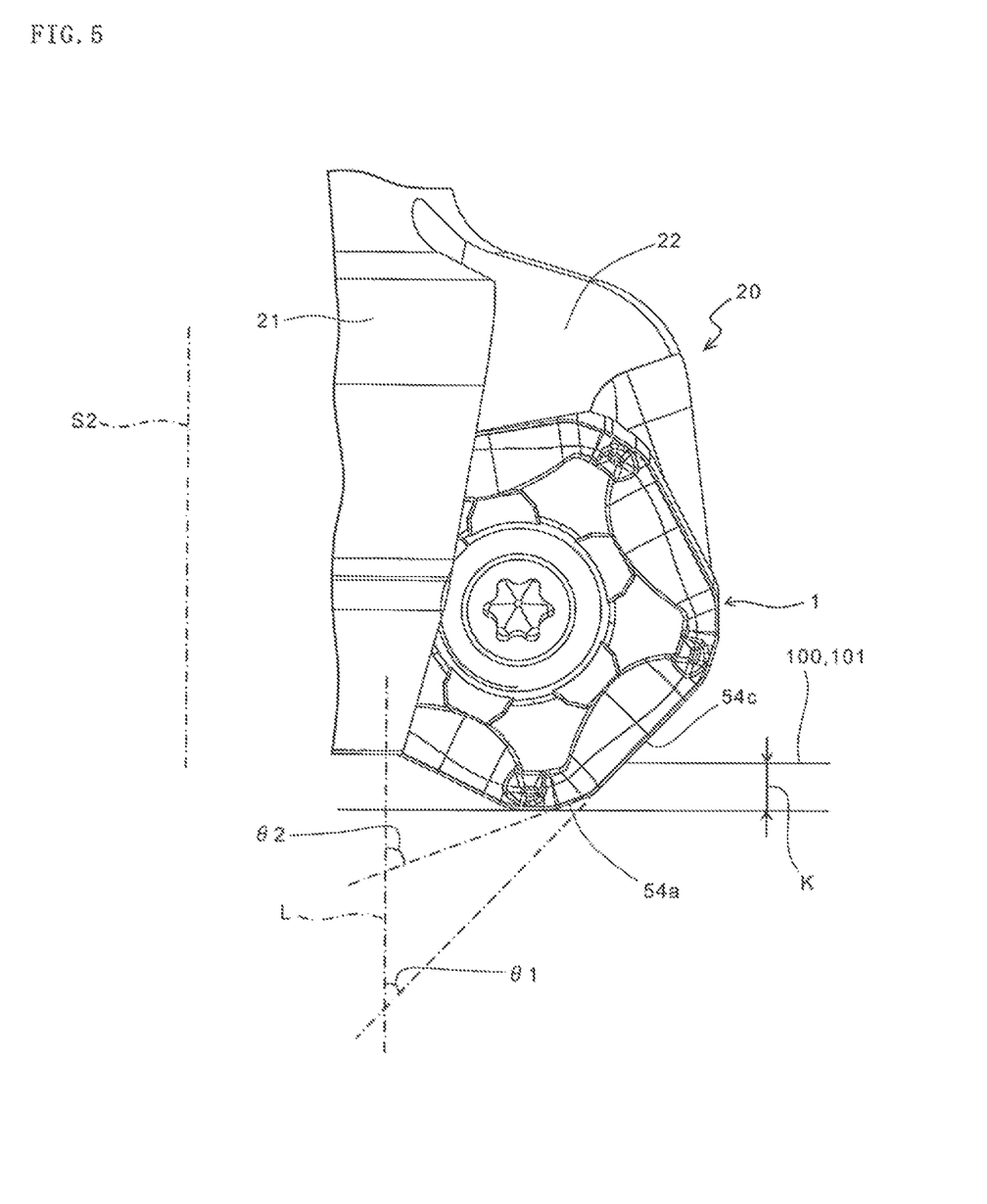
FIG. 5 is a partially enlarged view of the cutting tool shown in FIG. 4.

Similarly, an angle θ2 formed by the line L and the first cutting edge 54a is a peripheral cutting edge angle of the first cutting edge 54a.

In consideration of the cutting edge damage or fracture, the peripheral cutting edge angle of the first cutting edge 54a is preferably set to be larger than the peripheral cutting edge angle of the third cutting edge 54c. For example, the peripheral cutting edge angle of the first cutting edge 54a is set to be 1.2 times, preferably not less than 1.5 times the peripheral cutting edge angle of the third cutting edge 54c. Specifically, the peripheral cutting edge angle of the third cutting edge 54c is set to, for example, approximately 0-60°, and the peripheral cutting edge angle of the first cutting edge 54a is set to an angle larger than that, for example, approximately 60-80°. The first cutting edge 54a merely needs to be located between the third cutting edge 54c and the second flat cutting edge 5c, and a plurality of auxiliary cutting edges may be disposed between the two.

No particular limitation is imposed on the lengths of the third cutting edge 54c, the second flat cutting edge 5c, and the first cutting edge 54a. For example, the ratio of the length of the third cutting edge 54c and the length of the first cutting edge 54a is approximately 2:1 to 10:1, preferably 2:1 to 6:1.

Although the cutting edges 51 to 54 located in the intersection region of the second side surface 4b and the upper surface 2 have been exemplified above, these cutting edges 51 to 54 are formed in not only the intersection region of the second side surface 4b and the upper surface 2, but also the intersection region of the first side surface 4a and the upper surface 2, as described above. That is, the first flat cutting edge 5a includes the curved cutting edge 51b that is a part of the chamfered cutting edge 51, and the first inclined cutting edge 52a that is a part of the corner cutting edge 52. The first major cutting edge 5b is made up mainly of the primary cutting edge 54. The second inclined cutting edge 52b and the intermediate cutting edge 53 that are part of the corner cutting edge 52 located close to one end of the primary cutting edge 54, and the auxiliary primary cutting edge 51a that is part of the chamfered cutting edge 51 located close to the other end of the primary cutting edge 54 are used complementarily.

Thus, as shown in FIG. 1, the first flat cutting edge 5a, the first major cutting edge 5b, the second flat cutting edge 5c, and the second major cutting edge 5d are continuously alternately formed by these cutting edges 51 to 54 respectively located in the intersection regions. A first cutting process is executed by the first flat cutting edge 5a and the first major cutting edge 5b. A second cutting process is executed by the second flat cutting edge 5c and the second major cutting edge 5d. That is, if the first flat cutting edge 5a and the first major cutting edge 5b are deteriorated due to the execution of the first cutting process, and their cutting performance does not satisfy the desired level, the second cutting process is executed using the second flat cutting edge 5c and the second major cutting edge 5d by rotating the insert 1 by a predetermined angle with respect to the holder 21 described later. As stated earlier, the insert 1 of the present embodiment is capable of performing cutting up to a fifth cutting process on either the upper surface 2 or the lower surface 3.

Figure 4:
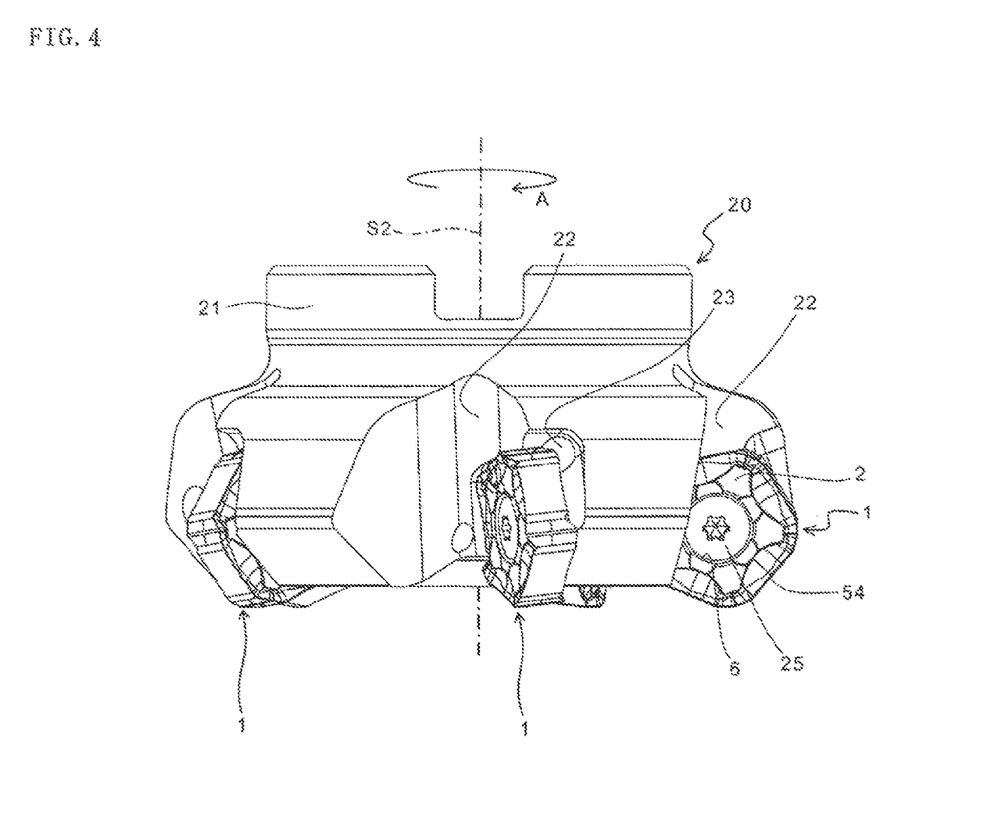
FIG. 4 is a side view showing a cutting tool according to an embodiment of the present invention.

On the other hand, a through hole 6 extending through the body from the upper surface 2 to the lower surface 3 is formed at a middle part of the upper surface 2. As shown in FIG. 4, the through hole 6 plays a role in passing an attachment screw 25 used for attaching the insert 1 to the holder 21. As shown in FIG. 2, a step part inside the through hole 6 is a contact part 7 to be engaged with the head of the attachment screw 25. The contact part 7 is formed at upper and lower parts so that the insert 1 can be reversely attached thereto.

Lands 8 are respectively formed along the cutting edges 5 on the upper surface 2. These lands 8 play a role in improving fracture resistance of the cutting edges 5, and are narrow-width flat surfaces. The widths of these lands 8 are suitably set from the viewpoint of the strength of the corresponding cutting edges 51 to 54. The widths of the lands 8 are usually set to a substantially constant value. In another embodiment, the lands 8 may not be disposed from the viewpoint of reducing cutting resistance.

The rake surface 9 (inclined surface) is formed correspondingly to the primary cutting edge 54 on the inward side of the land 8. In the present embodiment, the rake surface 9 is formed along the entire cutting edge 5, and includes a first rake surface 91 corresponding to the third cutting edge 54c and the first cutting edge 54a, and a second rake surface 92 connected to the first rake surface 91.

The first rake surface 91 and the second rake surface 92 may have a planar shape or curved surface shape. The planar first rake surface 91 and the planar second rake surface 92 may be connected to each other through a curved surface shaped intermediate rake surface.

<Cutting Tool>

Next, one embodiment of the cutting tool according to the present invention is described in detail with reference to FIGS. 4 to 6 by exemplifying the case of performing the second cutting process. As shown in FIG. 4, the cutting tool 20 (rotary cutting tool) according to the present embodiment has a plurality of inserts 1 attached to the holder 21.

In the present embodiment, the holder 21 has a plurality of circumferentially spaced insert pockets 22 at the peripheral front end thereof. The insert pockets 22 are portions obtained by cutting off the holder 21 into a substantially V-shape in a top view. The inserts 1 are respectively attached to a plurality of insert attachment surfaces 23 formed by the cutting off. Each of the inserts 1 is attached to the holder 21 with the upper surface 2 oriented forwardly in the direction of rotation of the holder 21 indicated by arrow A, and with the primary cutting edge 54 protruded outward from the outer periphery of the holder 21.

To be specific, as shown in FIG. 4, the inserts 1 are attached along the same circumference of the holder 21. For example, the attachment thereof is carried out by inserting the attachment screw 25 into the through hole 6 of each insert 1, and then screwing the attachment screw 25 into a female screw formed in the insert attachment surface 23 of the holder 21.

In the present embodiment, the rotation axis S2 of the holder 21 is positioned substantially perpendicular to a surface 101 of the workpiece 100 shown in FIG. 5. At this time, the third cutting edge 54c is inclined at an angle of approximately 45° with respect to the workpiece 100.

Further in the present embodiment, as shown in FIG. 6, the second flat cutting edge 5c and the surface 101 of the workpiece 100 are positioned parallel to each other by setting a so-called axial rake angle to be a negative value, for example, −6°.

More specifically, the insert 1 is attached to the holder 21 so that the insert 1 has a negative axial rake angle with respect to the rotation axis S2 of the holder 21. The second flat cutting edge 5c is perpendicular to the rotation axis S2 of the holder 21. The axial rake angle is determined by an angle formed by the reference plane S in the insert 1 shown in FIG. 3(a), and the rotation axis. S2 of the holder 21 (refer to FIGS. 4 and 5).

In another example, the second flat cutting edge 5c and the surface 101 of the workpiece 100 are not perfectly parallel to each other. For example, the second flat cutting edge 5c may be set at a gentle arcuate position with respect to the surface 101 of the workpiece 100. In this case, it is preferable to set to be arc of approximately R50 to R500.

For the type that allows both the upper and lower surfaces to be used for cutting, such as the inserts 1 of the present embodiment, a radial rake angle of the insert 1 with respect to the holder 21 is preferably set at a value of approximately −6° or less from the viewpoint of reducing the probability that an edge ridge portion of the lower surface of the insert 1 (when the upper surface thereof is used for cutting) interferes with a machined wall surface of the workpiece. The radial rake angle is preferably set at a value of approximately 20° or more from the viewpoint of reducing deterioration of the edge strength by relatively decreasing an actual clearance angle. In the present embodiment, the radial rake angle is more preferably set at −6 to −8° in order to achieve well-balanced compatibility of the above-mentioned two operation advantages.

With the cutting tool 20 having the foregoing configuration, the second flat cutting edge 5c and the second major cutting edge 5d cut the workpiece 100 by rotating the holder 21 in the direction of arrow A with reference to the rotation axis S2.

<Method of Manufacturing Machined Product>

Figure 7:
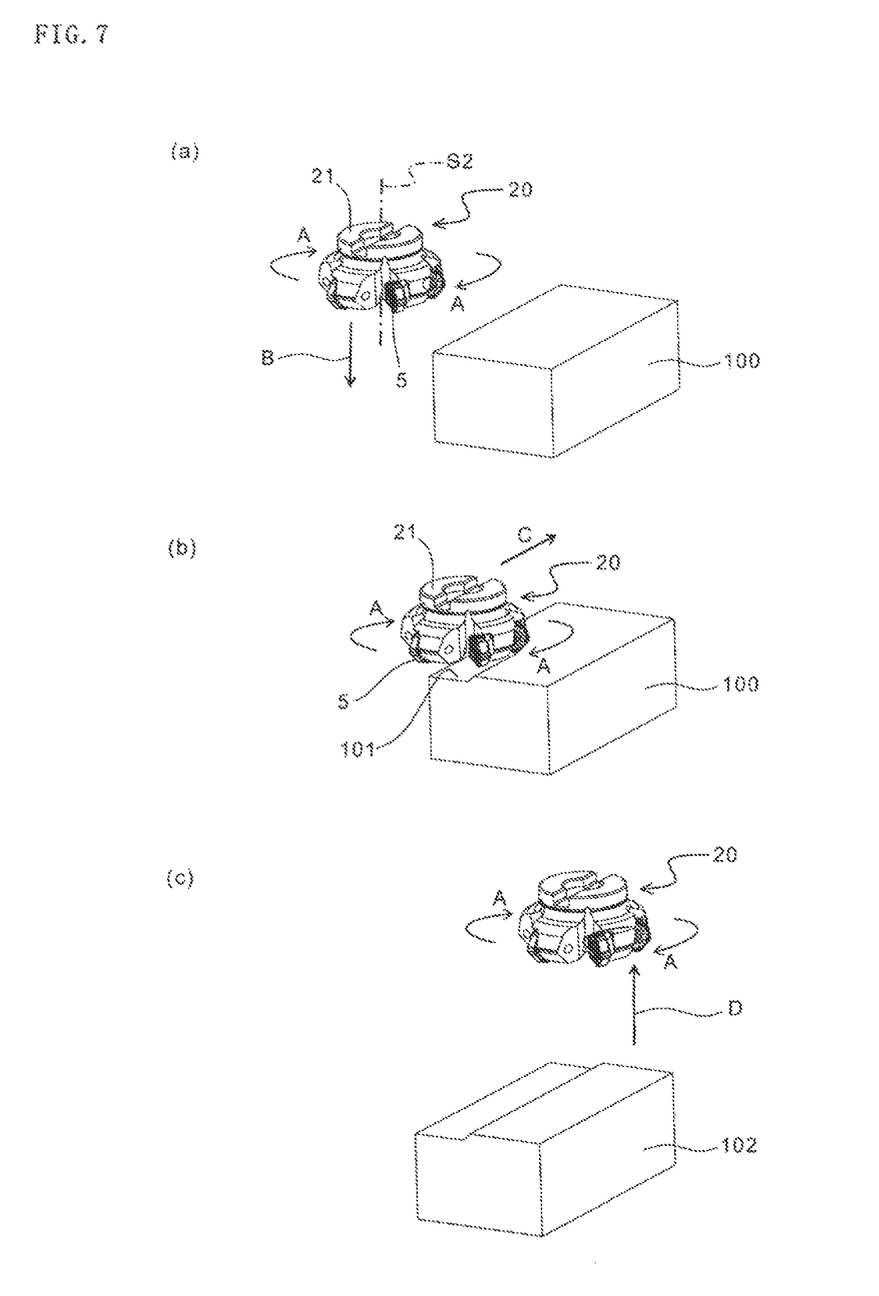
FIG. 7 is a process drawing showing a method of manufacturing a machined product according to an embodiment of the present invention.

An embodiment of the method of manufacturing a machined product according to the present invention is described in detail below with reference to FIG. 7, by taking the case of using the cutting tool 20. As shown in FIG. 7, the method of manufacturing the machined product according to the present embodiment includes the step of rotating the cutting tool 20; the step of bringing the cutting edges 5 of the rotating cutting tool 20 into contact with the workpiece 100; and the step of separating the cutting tool 20 from the workpiece 100.

To be specific, firstly, the workpiece 100 is fixed to a bed or the like of a milling machine (not shown), and an appropriate depth of cut is set by moving the holder 21 in a direction of arrow B, as shown in FIG. 7(a).

Subsequently, as shown in FIG. 7(b), the holder 21 is moved in a direction of arrow C while being rotated in the direction of arrow A around the rotation axis S2. This brings the primary cutting edge 54 into contact with the workpiece 100 located ahead in a feed direction, thereby cutting the workpiece 100 according to the depth of cut.

At this time, the plurality of inserts 1 sequentially enter a cutting region and perform cutting with the rotation. Therefore, an arcuate line (cutting trace) remains on the surface 101 of the workpiece 100. The arcuate line (cutting trace) is cut by the second flat cutting edge 5c, thus smoothing the surface 101. In the present embodiment, as shown in FIG. 5, it is set so that a part (lower part) of the entire length of the third cutting edge 54c close to the first cutting edge 54a cuts into the workpiece 100 by a predetermined depth of cut K.

Then, as shown in FIG. 7(c), after the cutting tool 20 passes through the workpiece 100, the cutting tool 20 is separated from the workpiece 100 by lifting the cutting tool 20 in a direction of arrow D. As a result, the machined product 102 whose upper surface is partially cut can be obtained as shown in FIG. 7(c).

When the cutting process is continued, the above cutting process may be repeated by bringing the cutting edges 5 into contact with the same portion or different portions of the workpiece 100 while retaining the rotation of the cutting tool 20. Accordingly, the operation that the individual inserts 1 contact and cut the workpiece 100 and then separate from the workpiece 100 is repeated sequentially. When the cutting edge portion in use is worn, the cutting can be continued with an unused cutting edge portion by rotating the insert 1 around the center axis S1 of the insert 1, or turning upside down.

While the several embodiments according to the present invention have been described and illustrated above, it is to be understood that the present invention is not limited to the foregoing embodiments and is applicable to any optional embodiments without departing from the gist of the present invention. For example, in the inserts 1 according to the foregoing embodiment, the description has been given by taking the case of the negative type that the side surface 4 is perpendicular to the upper surface 2 and the lower surface 3. This may be replaced with a so-called positive type cutting insert that the side surface 4 has a clearance angle.

The inserts 1 according to the foregoing embodiment has the configuration that both the upper surface 2 and the lower surface 3 are usable as the rake surface. Alternatively, the negative type cutting insert may be configured so that no cutting edge 5 is formed close to the lower surface 3. Even in this case, five corners are usable for cutting.

In another embodiment of the cutting tool, a predetermined inclination may be disposed between the other end portion "b" of the second flat cutting edge 5c and the machined surface 101 of the workpiece 100 so that the other end portion "b" protrudes outward from the front end of the holder 21 than the one end portion "a."

In yet another embodiment of the cutting tool, by changing attachment conditions of the inserts 1 to the holder 21, in a side view of the holder 21, the second flat cutting edge 5c is configured so that a straight line passing through its both end portions "a" and "b" is perpendicular to the rotation axis S2 of the holder 21, and is also configured to be a convex curve toward the front end of the holder 21. The radius of curvature of the curve may be constant over the entire length of the second flat cutting edge 5c. Hereat, the radius of curvature may be substantially constant. That is, even when there is an unavoidable error caused by manufacturing errors, attachment errors or the like of the inserts 1 and the holder 21, it is regarded as being "constant."

In the method of manufacturing the machined product according to the foregoing embodiment, the cutting is carried out by feeding the rotating cutting tool 20. Alternatively, the workpiece 100 may be fed and traveled while holding the rotating cutting tool 20 at a predetermined position.

Like a lathe, the cutting may be carried out by bringing the unrotated cutting tool 20 into contact with the rotating workpiece 100. Examples of processing machines include face milling cutters, end mills, milling machines, and drills. The inserts of the present invention can be used by attaching them to holders or chucks of these different types of processing machines.

The invention claimed is:

1. A cutting insert, comprising:
   an upper surface;
   a lower surface;
   a side surface which is connected to the upper surface and the lower surface, and comprises a first side surface and a second side surface in order one after the other; and
   a cutting edge comprises
      a first flat cutting edge and a first major cutting edge in order one after the other in an intersection region of the first side surface and the upper surface, and
      a second flat cutting edge and a second major cutting edge in order one after the other in an intersection region of the second side surface and the upper surface, wherein
   the first side surface comprises a first chamfered side surface with a curved shape, a first corner side surface with a planar shape, and a first major side surface in order one after the other, the second side surface comprises a second chamfered side surface with a curved shape, a second corner side surface with a planar shape, and a second major side surface in order one after the other, the intersection region of the second side surface and the upper surface comprises a first intersection region of the second chamfered side surface and the upper surface, and a second intersection region of the second corner side surface and the upper surface, the second flat cutting edge which is located from the first intersection region to the second intersection region, and has a downward convex curve with respect to a reference plane perpendicular to a central axis of the cutting insert in a side view and a lowermost portion in the first intersection region in a side view, and the second flat cutting edge further comprises a first inclined cutting edge which is located in the second intersection region and is inclined upward with respect to the reference plane as the first inclined cutting edge separates from the curved cutting edge in the side view.

2. The cutting insert according to claim 1, wherein a curve formed by the curved cutting edge is a spline curve.

3. The cutting insert according to claim 1, wherein the cutting edge further comprises a second inclined cutting edge which is located in the second intersection region and is connected to the first inclined cutting edge, and is inclined upward with respect to the reference plane as the second inclined cutting edge separates from the first inclined cutting edge in a side view.

4. The cutting insert according to claim 3, wherein an upward inclination angle of the second inclined cutting edge with respect to the reference plane is decreased as the second inclined cutting edge separates from the first inclined cutting edge in a side view.

5. The cutting insert according to claim 1, wherein the second side surface further comprises a second intermediate side surface located between the second corner side surface and the second major side surface, the intersection region of the second side surface and the upper surface further comprises a third intersection region of the second intermediate side surface and the upper surface, and the cutting edge further comprises an intermediate cutting edge which is located in the third intersection region and has an upward convex curve with respect to the reference plane in a side view.

6. The cutting insert according to claim 1, wherein the first major cutting edge is located in an intersection region of the first major side surface and the upper surface in the intersection region of the first side surface and the upper surface, and is inclined downward with respect to the reference plane as the first major cutting edge approaches the second corner side surface in a side view.

7. The cutting insert according to claim 6, wherein the first major cutting edge is continuously inclined downward with respect to the reference plane as the first major cutting edge approaches the second corner side surface in a side view.

8. The cutting insert according to claim 1, wherein the cutting edge further comprises an auxiliary major cutting edge which is located between the first major cutting edge and the second flat cutting edge, and is inclined downward with respect to the reference plane as the auxiliary major cutting edge approaches from the major cutting edge to the second flat cutting edge in a side view.

9. The cutting insert according to claim 8, wherein the auxiliary primary cutting edge is continuously inclined downward with respect to the reference plane as the auxiliary primary cutting edge approaches from the first major cutting edge to the second flat cutting edge in a side view.

10. The cutting insert according to claim 8, wherein a downward inclination angle of the auxiliary primary cutting edge with respect to the reference plane is increased as the auxiliary primary cutting edge approaches from the first major cutting edge to the second flat cutting edge in a side view.

11. A cutting tool, comprising: a cutting insert according to claim 1; and a holder configured to attach the cutting insert thereto.

12. The cutting tool according to claim 11, wherein the cutting insert which is attached to the holder and has a negative axial rake angle with respect to a rotation axis of the holder.

13. The cutting tool according to claim 11, wherein the second flat cutting edge is perpendicular to the rotation axis of the holder.

14. A method of manufacturing a machined product, comprising:

rotating a cutting tool according to claim 11;

bringing the cutting edge of the rotating cutting tool into contact with a workpiece; and separating the cutting tool from the workpiece.

* * * * *